(12) United States Patent
Nakagawa

(10) Patent No.: US 6,578,852 B2
(45) Date of Patent: Jun. 17, 2003

(54) SEAL FOR BALL SCREW AND BALL SCREW INSTALLING THE SAME

(75) Inventor: Hiromichi Nakagawa, Gunma (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/935,053

(22) Filed: Aug. 23, 2001

(65) Prior Publication Data

US 2002/0036384 A1 Mar. 28, 2002

(30) Foreign Application Priority Data

Aug. 25, 2000 (JP) ......................................... 2000-254761

(51) Int. Cl.$^7$ ................................................. F16J 15/02
(52) U.S. Cl. ........................ 277/628; 277/549; 277/560; 74/424.82
(58) Field of Search ................................ 277/549, 545, 277/559, 634, 560, 628; 74/459, 424.82, 424.83

(56) References Cited

U.S. PATENT DOCUMENTS

| 4,905,533 A | * | 3/1990 | Benton et al. | ............... 277/354 |
| 5,607,166 A | * | 3/1997 | Gorman | ....................... 277/436 |
| 5,906,136 A | * | 5/1999 | Yabe et al. | .................. 277/562 |
| 6,209,882 B1 | * | 4/2001 | Riess | .......................... 277/562 |
| 6,244,600 B1 | * | 6/2001 | Leturcq | ....................... 277/353 |
| 6,276,225 B1 | * | 8/2001 | Takeda et al. | ............... 277/354 |
| 6,302,403 B1 | * | 10/2001 | Pairone et al. | .............. 277/560 |

FOREIGN PATENT DOCUMENTS

| JP | 09-303517 A | * | 11/1997 |
| JP | 2000-230619 A | * | 8/2000 |

* cited by examiner

*Primary Examiner*—Teri Pham Luu
*Assistant Examiner*—André L. Jackson
(74) *Attorney, Agent, or Firm*—Sughrue Mion, PLLC

(57) ABSTRACT

A projection 5 is formed in ring shape at a side facing outside of a circular arc face 3 at the front end portion of a sealing lip L, the projection being to contact a frank face in a progressing side of the screw shaft. If the seal for ball screw is attached to the nut end portion, rigidity effecting along the lip thickness is reinforced by the projection 5, to subsequently prevent turnover easily happening hitherto in a steeply oblique part of the frank face of a progressing side. At this steeply oblique part, a double sealing function is exhibited by contacting the circular arc face 3 at the front end portion of the sealing lip L and the projection 5 at the side facing outside to this part.

19 Claims, 4 Drawing Sheets

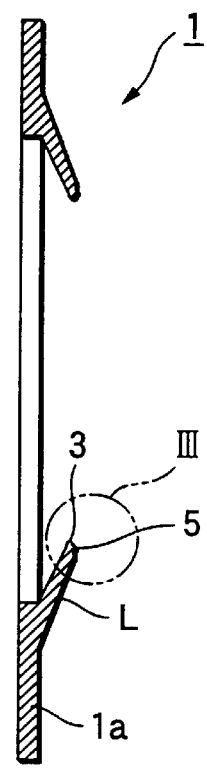
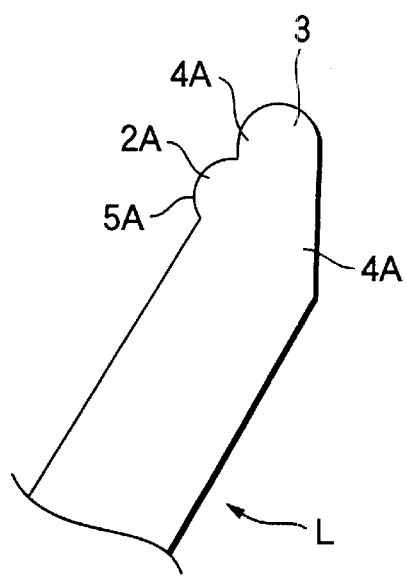
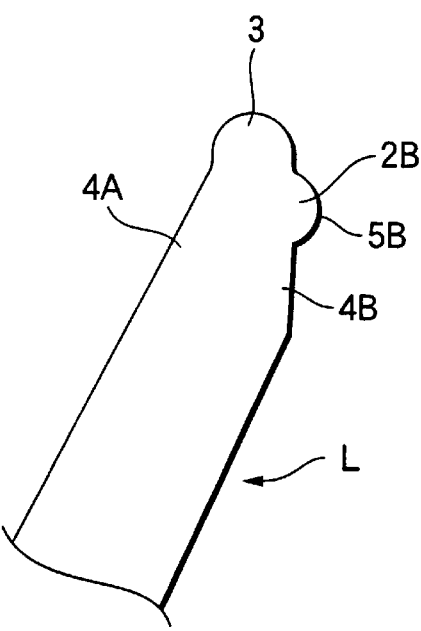

FIG.7
CONVENTIONAL
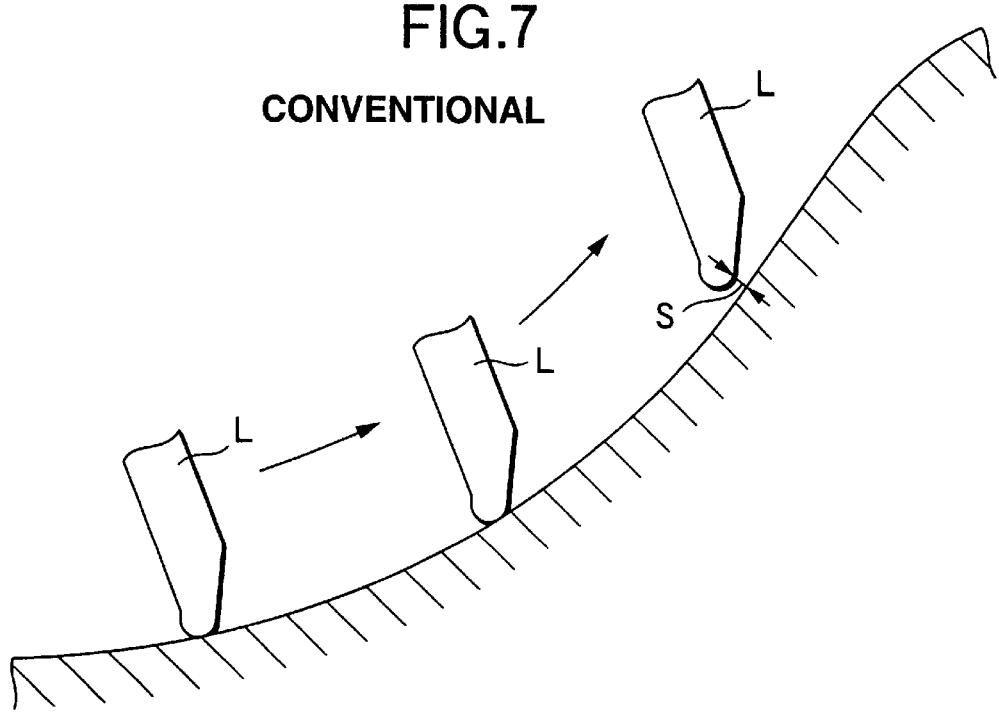

SEAL FOR BALL SCREW AND BALL SCREW INSTALLING THE SAME

BACKGROUND OF THE INVENTION

The present invention relates to a seal for ball screw, in particular, a seal useful for measures to dusts, dirt and the like against processed powder or spattering from such as laser beam machines. Further, the present invention also relates to a ball screw installing the seal.

As seals for ball screws for avoiding invasions of foreign matters such as dusts or machined powders from the exterior while driving the ball screw, a so-called wiper seal made of a felt, plastic or rubber has conventionally been used. A lip seal is excellent in a dust preventing performance and is less to create friction torque in a sealing part, and it has recently also been adapted to ball screws.

The lip seal is a doughnut-shaped disk of around 1 mm thickness composed of a material such as, for example, polyester elastomer or polyvinyl chloride, and the hole thereof is defined in such a manner that it mates with the cross sectional shape of the ball screw shaft and fits to the same with a slight interference. It is known that such a lip seal has the dust preventing performance far excellent than that of a brush wiper seal, and a generated friction toque is equivalent to or less than that of the brush wiper seal.

However, since the conventional lip seal for ball screws is, as seen in FIG. 7, formed to be particularly thin in the lip portion L at the front end of the inner circumference in the seal, rigidity is weak in a lateral direction (i.e., thickness direction) of the lip portion L. There is a problem wherein the front end of the lip portion L turns over while driving the ball screw. As seen in FIG. 7, as approaching up the upper part of the frank, in particular at the side contacting a frank opposite to the nut feeding direction in the screw shaft, and a space S probably appears, and consequently the dust preventing performance of the seal goes down.

SUMMARY OF THE INVENTION

Therefore, this invention has been realized in view of problems involved about the existing seal of ball screws. Accordingly, it is an object of the invention to provide a seal for ball screw that can effectively prevent invasions of foreign matters into the nut of the ball screw. The seal for ball screw according to the present invention is structured by improving the front end portion of the seal to be less to turn over the lip and cause a space thereby. In addition, it is an object of the present invention to provide a ball screw having such a seal for ball screws.

For accomplishing the above mentioned object, a first aspect of the invention is that a seal for a ball screw which has a sealing lip at an inside circumference of a sealing main body and is to be attached to a nut end portion of a ball screw, said sealing lip being adapted to the cross sectional shape of a ball screw shaft, characterized by providing projections at the front end portion of the sealing lip and at the side thereof being remote from the nut.

The projection has preferably a surface of circular-arc in cross section.

More preferably, the front end portion of the sealing lip also has a surface of circular-arc in cross section.

A second aspect of the invention is to structure the ball screw by attaching the seal for the ball screw as set forth in the first aspect to the nut end portion.

According to the invention, since the ring shaped projections are formed on the outer face in thin thickness of the front lip portion of the seal for ball screw, the rigidity is made strong along thickness. Accordingly, the front lip portion is difficult to turn over, which contacts the frank of the screw shaft opposite to the nut feeding direction during driving the ball screw to subsequently improve the dust preventing performance of the seal.

In addition, the above-mentioned object can be achieved by a seal for ball screw, according to the present invention, that comprises:

a sealing main body attached to a nut end portion of the ball screw; and a sealing lip inwardly protruding from the sealing main body and extending substantially along a cross sectional shape of a ball screw shaft of the ball screw, wherein the sealing lip includes:

a annular-shaped projection disposed at an end portion of the sealing lip.

Further, the above-mentioned object can also be attained by a ball screw, according to the present invention, comprising:

a ball screw shaft;

a ball screw nut movable along the ball screw shaft; and a seal attached to an end portion of the ball screw nut, wherein the seal comprises a sealing main body attached to a nut end portion of the ball screw, and a sealing lip inwardly protruding from the sealing main body and extending substantially along a cross sectional shape of a ball screw shaft of the ball screw, wherein the sealing lip includes a annular-shaped projection disposed at an end portion of the sealing lip.

According to the invention, since the annular-shaped projection is formed on the end portion of the sealing lip, the rigidity is made strong along thickness. Accordingly, the front end portion of the sealing lip becomes difficult to turn over, to thereby improve the dust preventing performance of the seal.

In addition, in the above-mentioned construction according to the present invention, it is advantageous that the annular-shaped projection is disposed at one of side faces of the end portion of the sealing lip. With this advantageous construction, it is possible to improve a sealing ability, because of a double sealing operation that can be created by contacting both of the front end portion and the annular-shaped projection with the steeply oblique part of the frank surface of the screw shaft.

BRIEF DESCRIPTION OF THE DRAWINGS

FIG. 2 is a vertically cross sectional view of the seal of FIG. 1;

FIG. 3A is an enlarged view of a circled part III of FIG. 2;

FIG. 3B is an enlarged view of the circled part III of FIG. 2 modified example of the embodiment;

FIG. 7 is a view for explaining the turnover of the lip portion at the front end in the lip seal for the ball screw.

DETAILED DESCRIPTION OF THE PREFERRED EMBODIMENTS

Explanation will be made to a mode for carrying out the invention with reference to the attached drawings.

Figure 1:
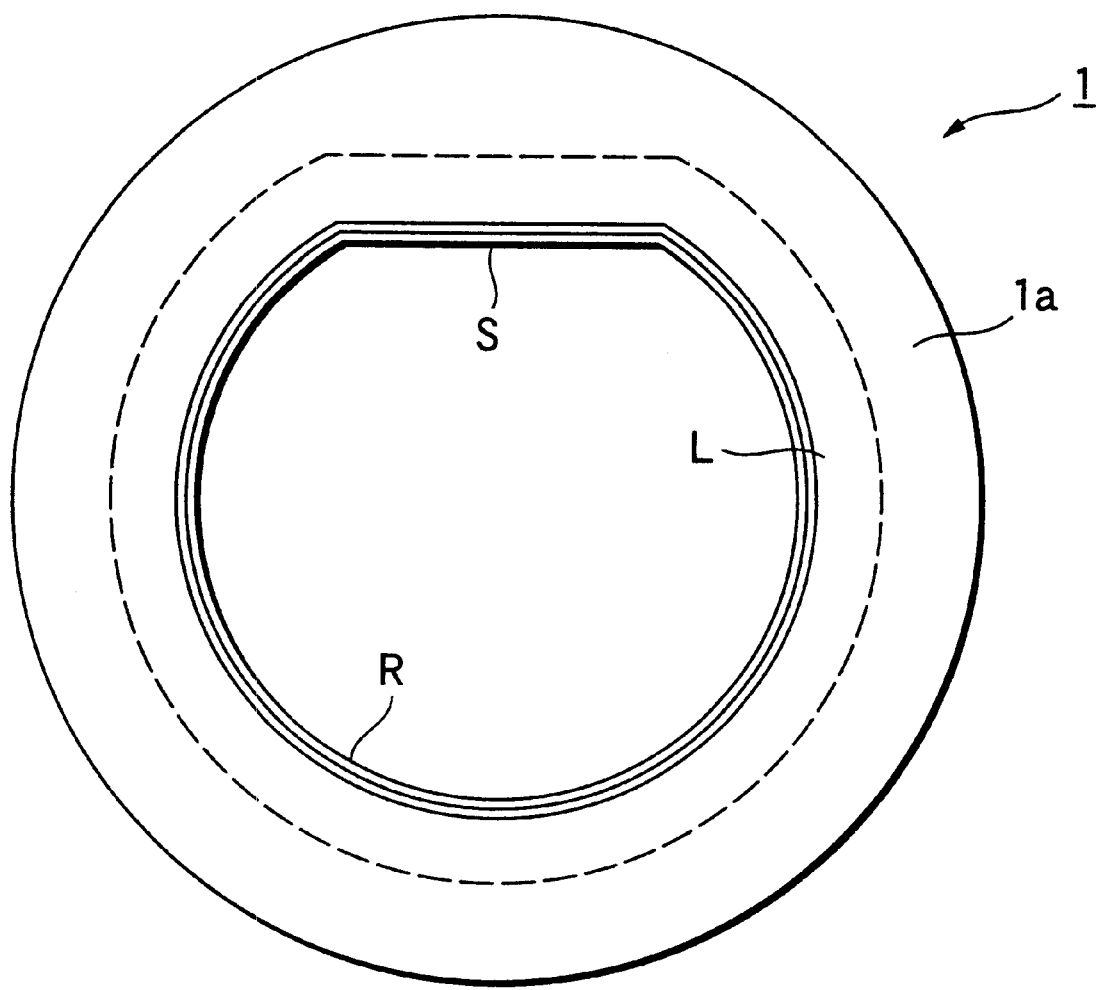
FIG. 1 is a front view showing the seal of one embodiment of the invention.
Figure 4:
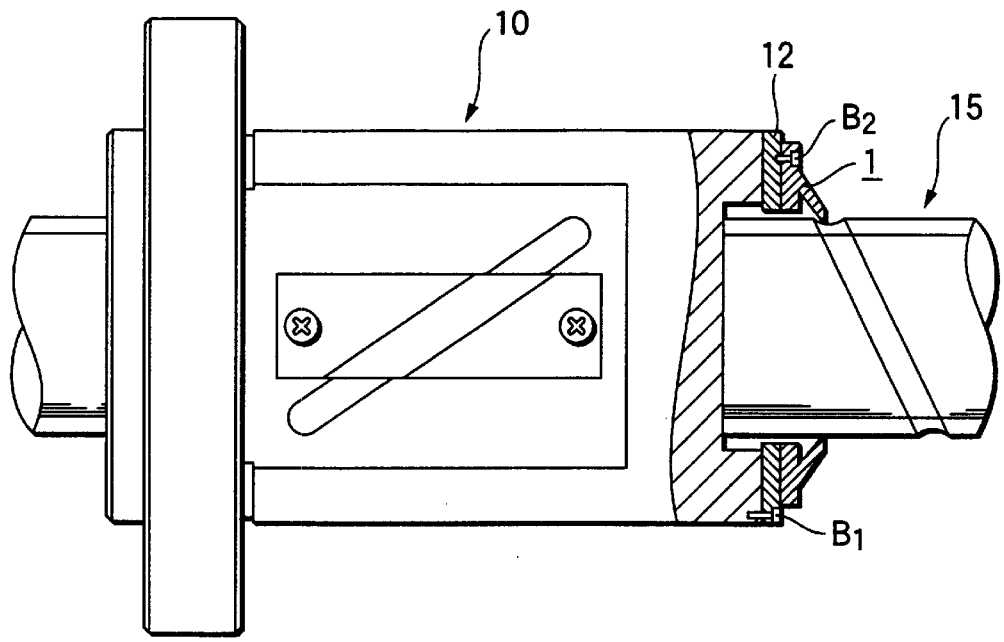
FIG. 4 is a cross sectional view of elementary parts showing that the seal for ball screw of the invention to the nut of the ball screw.
Figure 5:
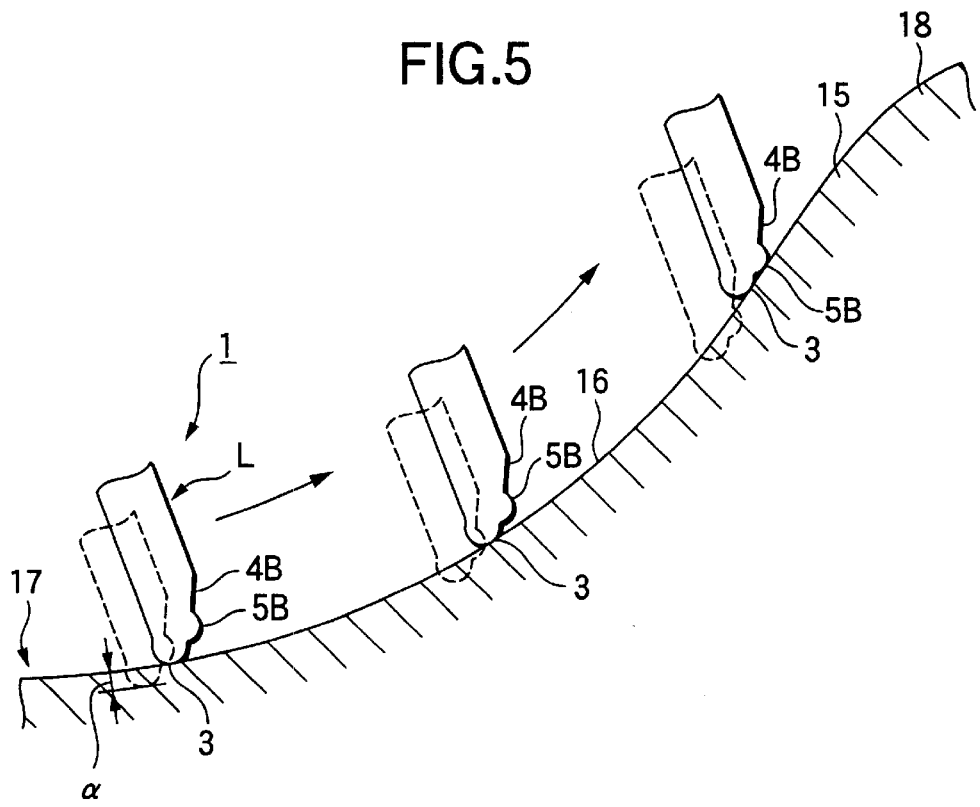
FIG. 5 is a view for explaining the seal for the ball screw of the invention.
Figure 6:
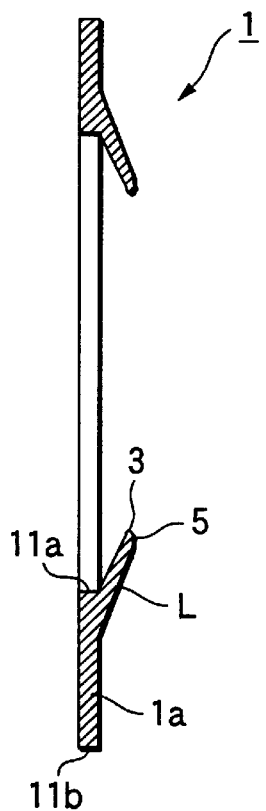
FIG. 6 is a vertically cross sectional view of the seal of the other embodiment of the invention.

FIGS. 1 through 5 show one embodiment of the invention. FIG. 1 is a front view of the seal of ball screw. FIG. 2 is a vertically cross sectional view of the same. FIG. 3A is an enlarged cross sectional view of a lip portion thereof. FIG. 3B is an enlarged cross sectional view of a lip portion according to the modified example. FIG. 4 is cross sectional views of elementary parts showing a condition of attaching the seal of ball screw according to the invention to the nut of the ball screw. FIG. 5 is a view for explaining operations of the seal of ball screw, and FIG. 6 is a vertically cross sectional view of the other embodiment.

At first to explain a structure, the seal 1 of ball screw comprises a plane part 1a as the seal main body and a sealing lip L. The plane part 1a is formed into a doughnut-shaped disk and has a thickness of about 1 mm. The plane part 1a is made of, for example, polyester elastomer. The plane part 1a serves as an attaching part to the ball screw. At the inside of the plane part 1a, the sealing lip (also called briefly as "lip") L projecting outward obliquely in conical shape is integrally unified with the same material.

A hole around an end point of the lip L is formed in such a manner that it mates with the cross sectional shape of the ball screw shaft and fits to the same with a slight interference defined by α—see FIG. 5. As shown in FIG. 1 the shape of the hole of FIG. 1 has a straight part S at one part and a circular arc part R at the other part, and the hole is shaped corresponding to the cross sectional shape of the screw shaft of a ball screw. The straight part S is for contacting a raceway surface of the screw shaft, and is shown to be straight for simplification of explanation. This part might be complicated by combining curve lines, depending on shaft diameters of ball screws or radius of a groove, or might be straight as shown. However, in each case, the part contacting the raceway surface of the screw shaft (a face other than an outer diameter part in the outer circumference of the screw shaft) is shown to be straight in FIG. 1. The circular arc part R contacting the outer diameter of the screw shaft and the straight part S contacting the raceway surface are a ring like lip L according to the same cross section and plane part 1a.

The lip L of the inside circumference of the seal 1 becomes smaller in thickness as coming toward the end point as shown in FIGS. 2 and 3A, and the most front end portion contacting the screw shaft is an arced face 3 in cross section. A face 4A, that is opposed to a tapered face 4B and is disposed at the interior side (directed to the nut) of the sealing lip L, is formed with a projection 2A continuously in ring following the ring shaped lip L, and the projection 2A has an arc face 5A formed thereon.

Note that although in the above-mentioned embodiment the projection 2A is formed on the face 4A disposed on the interior side, it is possible to modify such construction into a modified example as shown in FIG. 3B. In the modified example, the tapered fare 4B located at the exterior side (remote side from the nut) of the sealing lip L is formed with a projection 2B continuously in ring following the ring shaped lip L, and the projection 2B has an arc face 5B formed thereon.

The seal 1 for ball screw is attached to the edge face of a nut 10 shown in FIG. 4. That is, to the edge face of the nut 10 of the ball screw, the sealing holder 12 is secured by a bolt B1. To the edge face of the sealing holder 12, the seal 1 is fixed by a bolt B2.

Next, actuation will be explained referring to FIG. 5 while showing the sealing lip L according to the modified example.

The lips L shown with dotted line in FIG. 5 are states before attaching to the ball screw. When attaching the lip to the end part of the nut 10 as shown in FIG. 4, the front end of the lip L elastically contacts a right side frank 16 of the screw shaft 15 owing to the presence of the interference α. This contact is that at the right side frank 16 being obliquely moderate, in short, at a valley 17 of the screw shaft 15 and portions around the same, the only circular arc 3 of the most front end of the lip L contacts the right side frank 16. On the other hand, at the steeply oblique part, in short, at a mountain 18 of the screw shaft and portions around the same, the circular arc 3 of the most front end contacts the right side frank 16. In this case, one point of the circular arc 3 can be easy to contact the right side frank 16.

In addition, note that in the case of the modified example shown in FIG. 3B, at the steeply oblique part, in short, at a mountain 18 of the screw shaft and portions around the same, the circular arc 3 of the most front end and the circular arc 5B of the projection 2B can contact the right side frank 16 together. In this case, each one point of the circular arcs 3, 5B is easy to contact the right side frank 16. When the nut 10 straightly reciprocates by relative rotation of the ball screw shaft 15 and the nut 10, a sliding movement is carried out while the seal 1 closely contacts the outer surface of the ball screw shaft 15 at the most front end part of the lip L of the seal 1. For example, when the nut 10 advances rightward in FIG. 4, the lip L of the lip seal 1 seals as sliding on the face of the right side frank 16 as seen in FIG. 5 following rotation of the ball screw shaft 15. Namely, as mentioned above, in the existing seal for the ball screw, the lip turns over at the steeply oblique frank face to easily make a space S, but in the seal 1 of this embodiment, an improved sealing can be created.

Further, in the case of the sealing lip L of the modified example, a double sealing can be created by both circular arcs 3, 5B, because a tapered face 4B located on the exterior side (remote side from the nut) of the sealing lip L is formed on with the projection 2B having the circular arc 5B.

Furthermore, in the case of the sealing lip L of the example shown in FIG. 3A, a double sealing relative to the steeply oblique part of the left side flank of the screw shaft (not shown) can also be created. Namely, because the face 4A, that is opposed to the tapered face 4B of the sealing lip L and is located at the interior side of the sealing lip L, is formed with the projection 2A having the circular arc 5A, both of the circular arcs 3 and 5A can be brought in contact with the steeply oblique part.

Moreover, as the circular arc 5 at the front end of the lip L projects, the thickness by this portion is large and rigidity effecting in a thickness direction at the lip end portion is large, so that the lip is difficult to turn over at the steeply oblique frank face with a very excellent sealing property. FIG. 6 shows the other embodiment according to the invention. The sealing lip L is furnished on the inside circumference of the seal main body 1a. Similarly to the above embodiment, the base end of the lip L continues to the inside circumference of the seal main body 1a, and also as the seal 1 shown in FIG. 6, the base end of the lip L positions at an inside circumference 11a and an outside circumference of the seal main body 1a. Accordingly, it is sufficient that the front end of the lip L positions inside than the inner periphery 11a of the seal main body 1a. By the way, the front end of the lip L of FIG. 6 is shaped as in that of FIG. 3.

The seal for the ball screw of the invention does not especially limit materials if enabling to provide elasticity. Polymer containing lubricant may be raw materials, and injected products of these raw materials are enough. An example where the polymer containing lubricant is the raw material will be explained. For example, a raw material mixed with paraffin based mineral oil of 50 wt % is used to polyethylene comprising polyethylene of low molecular weight: 45 wt % (molecular weight $1 \times 10^3$ to $5 \times 10^5$) and polyethylene of ultra high molecular weight: 5 wt % (molecular weight $1 \times 10^6$ to $5 \times 10^6$), and the mixture is heated and melted, poured into a desired mold, cooled to solidify as applying pressure, and formed.

The main body 1a of the above mentioned seal 1 is formed to be plane in both sides being parallel, but depending on conditions such as shapes of attaching the seal 1 in the sealing holder 12, there may be embodiments of not parallel in inside and outside or of one side being curved.

The main body 1a is formed with ring-shaped projections in succession on the tapered face of the sealing lip L, but the projections are not always successive in ring shape but may be partially broken to be on and off in ring shape.

As above mentioned, in the seal for the ball screw of the invention and the ball screw attached with the seal at the nut end portion, the projection is provided in ring in a successive direction of the lip. Accordingly, the rigidity becomes large along the lip thickness and the lip is difficult to turn over.

Further, the annular-shaped projection may be disposed at one of side faces of the sealing lip.

In this case, at the steeply oblique face of the frank, not only the most front end portion of the lip but also the projection serve the sealing function, thereby to improve the dust protective property.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A seal for ball screw, said seal comprising:
   a sealing main body attached to a nut end portion of the ball screw;
   a sealing lip inwardly protruding from said sealing main body and extending substantially along a cross sectional shape of a ball screw shaft of the ball screw, said sealing lip further comprising an end portion; and
   an annular-shaped projection disposed proximate said end portion of the sealing lip.

2. The seal according to claim 1, wherein said annular-shaped projection is disposed at one of side faces of the end portion of the sealing lip.

3. The seal according to claim 2, wherein the one of side faces of the sealing lip is opposite to the other of side faces of the end portion that is directed to the nut.

4. The seal according to claim 1, wherein said lip becomes smaller in thickness coming toward the end portion.

5. The seal according to claim 1, wherein said annular-shaped projection is successively extended into an annular-shape.

6. The seal according to claim 1, wherein said annular-shaped projection has a surface of circular-arc in a cross section.

7. The seal according to claim 1, wherein said sealing lip protrudes from said sealing main body obliquely to a central longitudinal axis of said main body.

8. The seal according to claim 1, wherein said sealing lip protrudes axially from said sealing main body so as to form a conical shape.

9. The seal according to claim 1, wherein said annular-shaped projection extends from said sealing lip in an axial direction of said sealing main body.

10. A ball screw comprising:
    a ball screw shaft;
    a ball screw nut movable along said ball screw shaft; and
    a seal attached to an end portion of said ball screw nut,
    wherein said seal comprises
       a sealing main body attached to a nut end portion of the ball screw,
       a sealing lip inwardly protruding from said sealing main body and extending substantially along a cross sectional shape of a ball screw shaft of the ball screw, said sealing lip further comprising an end portion; and
       an annular-shaped projection disposed proximate said end portion of the sealing lip.

11. The ball screw according to claim 10, wherein said annular-shaped projection is disposed at one of side faces of the end portion of the sealing lip.

12. The ball screw according to claim 11, wherein the one of side faces of the sealing lip is opposite to the other of side faces of the end portion that is directed to the nut.

13. The ball screw according to claim 10, wherein said lip becomes smaller in thickness coming toward the end portion of said sealing lip.

14. The ball screw according to claim 10, wherein said annular-shaped projection is successively extended into an annular-shape.

15. The seal according to claim 10, wherein said annular-shaped projection has a surface of circular-arc in a cross section.

16. The ball screw according to claim 10, wherein said sealing lip protrudes from said sealing main body obliquely to a central longitudinal axis of said main body.

17. The ball screw according to claim 10, wherein said sealing lip protrudes axially from said sealing main body so as to form a conical shape.

18. The ball screw according to claim 10, wherein said annular-shaped projection extends from said sealing lip in an axial direction of said sealing main body.

19. A seal for ball screw, said seal comprising:
    a sealing main body attached to a nut end portion of the ball screw;
    a sealing lip inwardly protruding from said sealing main body and extending substantially along a cross sectional shape of a ball screw shaft of the ball screw, wherein said sealing lip further comprising an end portion; and
    means for increasing rigidity of the sealing lip, and said means for increasing rigidity is disposed proximate said end portion of the sealing lip so as to resist turning over of the lip.

* * * * *